United States Patent [19]
Deutsch

[11] Patent Number: 6,022,865
[45] Date of Patent: Feb. 8, 2000

[54] STABLE AQUEOUS SOLUTION HAVING HIGH CONCENTRATIONS OF CALCIUM AND PHOSPHATE IONS AND SOLID COMPLEX

[75] Inventor: Edward A. Deutsch, Cincinnati, Ohio

[73] Assignee: University of Cincinnati, Cincinnati, Ohio

[21] Appl. No.: 07/972,086

[22] Filed: Nov. 5, 1992

Related U.S. Application Data

[63] Continuation of application No. 07/352,148, May 15, 1989, abandoned.

[51] Int. Cl.[7] .......................... A01N 43/04; A01N 57/00; A23L 1/30
[52] U.S. Cl. .......................... 514/53; 514/54; 514/23; 514/1; 514/123.13; 514/123.1; 426/648; 426/72; 424/1.65; 424/9.35; 424/439; 424/499; 536/127
[58] Field of Search .................... 514/53, 51, 2, 514/1, 123.13, 123.1, 54, 23; 435/99; 426/116; 536/127

[56] References Cited

U.S. PATENT DOCUMENTS

| | | | |
|---|---|---|---|
| 2,541,568 | 2/1951 | Baur et al. | 536/117 |
| 3,962,484 | 6/1976 | Grosso et al. | 426/116 |
| 4,058,601 | 11/1977 | Hata et al. | 514/51 |
| 4,263,052 | 4/1981 | Bichsel et al. | 435/99 |
| 4,414,238 | 11/1983 | Schmidl | 536/117 |
| 4,497,800 | 2/1985 | Larson et al. | 514/2 |
| 4,546,095 | 10/1985 | Markov | 536/117 |
| 4,787,940 | 11/1988 | Kayane et al. | 536/127 |

FOREIGN PATENT DOCUMENTS

| | | | |
|---|---|---|---|
| 2092001 | of 1982 | United Kingdom | 536/124 |
| 8200447 | of 1982 | WIPO | 536/127 |

OTHER PUBLICATIONS

Tenebaum et al: Phosphoethanolamine—and Fructose 1, 6–Diphosphate—Induced Calcium Uptake in Bone Formed in Vitro, Bone and Mineral, 2 (1987), 201–210.

*Primary Examiner*—Louise N. Leary
*Attorney, Agent, or Firm*—Wood, Herron & Evans, LLP

[57] ABSTRACT

A stable aqueous solution having high concentrations of both biologically available calcium and biologically available phosphate is provided by combining phosphate and calcium ions in the aqueous solution wherein the phosphate is in the form of a saccharide phosphate and preferably a monosaccharide diphosphate. Preferred solutions include fructose 1,6-diphosphate, glucose diphosphate, sucrose diphosphate and so on. This is particularly suitable for providing calcium and phosphate ions in a total parenteral nutrition solution.

13 Claims, No Drawings

STABLE AQUEOUS SOLUTION HAVING HIGH CONCENTRATIONS OF CALCIUM AND PHOSPHATE IONS AND SOLID COMPLEX

This application is a File Wrapper Continuation of application Ser. No. 07/352,148, filed May 15, 1989 now abandoned.

The human diet requires sources of both calcium ions and phosphate ions to provide for among other things proper bone development. Due to the chemical relationship of calcium and phosphate ions these nutrients must often be obtained from separate sources. When provided at higher concentration in the same aqueous solution, they precipitate out as calcium phosphate. It is desirable, however, to provide certain aqueous solutions which contain high concentrations of both calcium and phosphate.

This is particularly a concern with total parenteral nutrition (TPN) solutions. A TPN solution is generally administered intravenously to a patient, particularly burn patients, growing infants of low birth weight, or other patients who have difficulty ingesting nutrition through the alimentary tract. Since they are intended to be total nutrition diets they require both high concentrations of calcium (generally 20–25 millimoles per liter) and phosphate ions (generally around 20 millimoles per liter). Unfortunately, the inherent insolubility of calcium phosphate at physiologically acceptable pH values prevents providing an aqueous source containing both calcium ions and phosphate ions at that concentration.

To prevent precipitation it is possible to bind the calcium or the phosphate ions with other chemical groups. However these groups must not precipitate themselves and must be compatible with the biological milieu. Further, they must not so tightly bind either the calcium or phosphate that the ions become unavailable for biological use.

Further for additives to TPN solutions it is preferable that the composition be lypholized for storage and be capable of being redissolved in water for use.

PCT Application WO82/0355 published Oct. 28, 1982 discloses a TPN solution which does have some calcium and phosphate ions present. The solution requires a polyhydric alcohol as a stabilizer for the calcium and phosphate. Accordingly, these compositions are not lyophilizable.

This application also discloses that various water soluble chelating agents can be used to prevent precipitation of calcium phosphate such as ethylene diaminetetraacetic acid, water soluble polyethylene glycols, ethyleneglycoldiacetic acid and saccharide salts. However, use of these compounds is undesirable since they cannot be easily metabolized and may have unwanted side effects if used in the quantities necessary to maintain sufficient amounts of calcium and phosphate ions in solution.

Examples of TPN solutions are disclosed for example in Larson et al U.S. Pat. No. 4,497,800, Schmidl U.S. Pat. No. 4,414,2388. However, none of these provide an adequate source of both calcium and phosphate.

SUMMARY OF THE INVENTION

The present invention is premised on the realization that a stable aqueous solution containing high concentrations of both biologically available calcium and biologically available phosphate can be provided wherein the phosphate source is a monosaccharide phosphate. More particularly the present invention is premised on the realization that such a solution can be formed wherein the phosphate source is a saccharide diphosphate such as fructose 1,6-diphosphate.

The present invention provides a method of stabilizing the calcium ions in solution wherein the calcium ions ligate to the phosphate and hydroxyl groups attached to the saccharide and remain in solution due to the presence of the saccharide molecule. The saccharide phosphate molecule is compatible with TPN solutions and compatible with the biological milieu. Further, the saccharide phosphate binds tightly enough to the calcium to prevent precipitation of calcium phosphate but is not so tightly bound that the calcium is not released after injection. Further the saccharide phosphate is metabolized in vivo to release the necessary phosphate ion. Further, the calcium saccharide phosphate combination can be lyophilized under sterile conditions to provide a conveyance for the addition of various amounts of $Ca/PO_4$ to TPN solutions in the hospital pharmacy.

The present invention provides clear solutions which are stable for prolonged periods of time and which can be lyophilized under sterile conditions to provide a convenient and practical clinical source of calcium/phosphate additive. The present invention is useful in a variety of different applications such as the formation of TPN's as well as calcium and phosphate fortified drinks such as perspiration replacement drinks (Gatorade brand type drinks), calcium and phosphate fortified fruit drinks and food supplements for children, menopausal women and the like.

The objects and advantages of the present invention will be further appreciated in light of the following detailed description.

DETAILED DESCRIPTION OF THE INVENTION

The present invention is a dietary composition comprising an aqueous solution of calcium ions chelated to a saccharide phosphate ion. The solution is formed by combining a biologically acceptable aqueous composition, a water soluble calcium salt and a water soluble saccharide phosphate composition. Alternately, a solid preformed calcium saccharide phosphate composition can simply be added to the aqueous solution in an effective amount.

A variety of sources of saccharide phosphate compositions can be used in the present invention. Examples include alkali metal salts of monosaccharide monophosphates and diphosphates, disaccharide monophosphates and diphosphates. Specifically, suitable monosaccharide compositions include sodium fructose phosphate, sodium fructose diphosphate, sodium glucose phosphate, sodium glucose diphosphate, sodium sucrose phosphate and sodium sucrose diphosphate. Any biologically acceptable salts, such as the potassium and ammonium salts, of these compositions are also suitable.

The preferred monosaccharide phosphate for use in the present invention is sodium 1,6-fructose diphosphate.

Calcium ions can be added in a variety of different water soluble compositions wherein the counter ion is either easily removed from solution or more preferably is itself biologically acceptable. Preferred sources of calcium include calcium chloride, calcium gluconate, calcium acetate, calcium ascorbate and calcium orotate.

Generally, there will be excess calcium present. As long as all of the phosphate present is in the form of the saccharide phosphate, no precipitation will occur. Likewise, if all phosphate is present in the form of the saccharide phosphate there can be excess phosphate without precipitation. If any of the phosphate is present in a form other than the saccharide phosphate generally there should be two saccharide bonded phosphates for each calcium ion present to bond to the calcium ion and avoid precipitation caused by free calcium ions. For purposes of the present invention, a monosaccharide diphosphate provides two phosphate equivalents.

The solution is formed by combining the saccharide phosphate composition with the calcium salt in aqueous solution to the desired concentrations. As indicated previously, calcium and phosphate ions in combination are soluble only at very low concentrations.

Generally at biologially relevant pH values (5.5 to 8.5) and without benefit of the present invention, calcium and phosphate ions are compatible in solutions of about 10 millimolar calcium and up to 10 millimolar phosphate. Accordingly, the benefits of the present invention will be most appreciated when the concentrations of calcium ion and phosphate ions are so high that they would not otherwise be stable. Generally the present invention is beneficial to establish calcium ion concentration in excess of 10 millimolar and phosphate concentration in excess of 10 millimolar. Generally at biologically relevant pH values the maximum concentrations of phosphate and calcium are 10 mM each. Although if for example calcium levels are lower the concentration of phosphate may slightly exceed 10 mM. Accordingly, high concentrations of calcium ions and phosphate ions refer to relative concentrations of the two which would precipitate out of the solution if the phosphate ions were present in the form of $PO_4^{-2}$ as opposed to saccharide phosphate ions.

The solubility of 1,6 fructose diphosphate monocalcium salt is about 1000 mM. The solution can be used as is or the water can be evaporated or lyophilized to form a solid complex wherein the calcium is bonded to the monosaccharide phosphate. The solid complex can be redissolved in water to provide a stable aqueous solution.

The present dietary aqueous solution can be employed in a variety of different applications. When forming part of a total parenteral nutrition solution it will be combined with a series of other saccharides, amino acids, and other nutrients in a formulation designed to provide the total nutritional diet for a patient. Generally these will include from about 5 to about 10 grams per 100 milliliters L-amino acids such as L-leucine, L-phenylalanine, L-methionine, L-lysine, L-isoleucine, L-valine, L-histidine, L-threonine, L-tryptophan. In addition to this certain electrolytes such as sodium acetate, dibasic potassium phosphate, sodium chloride and magnesium chloride can be present. Exemplary TPN solutions are disclosed for example in Larson et al U.S. Pat. No. 4,497,800, Schmidl U.S. Pat. No. 4,414,238.

The prepared $Ca/PO_4$ solution is generally lyophilized and stored. For use the lyophilized material is reconstituted with distilled or deionized water and the aliguots of this are added to the TPN solution. The ability to lyophilize the complexed calcium-saccharide phosphate is an extremely significant benefit making this a commercially viable product.

The present invention can also be used in various dietary agueous solutions designed for enteral ingestion. For example, the present invention is suitable for providing calcium and phosphate concentrations above about 40 mM for solutions designed to replace nutrients and electrolytes lost through perspiration such as Gatorade brand drink mix. The present invention is also applicable for other enterally ingestible aqueous solutions such as fruit drinks and juices especially those designed for the children market.

The present invention will be further appreciated in light of the following detailed example.

EXAMPLE No. 1

An aqueous pharmaceutically acceptable solution was prepared by dissolving 0.21 g D-fructose 1,6-diphosphate monocalcium salt in 1.0 mL distilled water, and adding to this solution 0.5 mL of a 1.0 M solution of calcium chloride in distilled water. The final concentrations of calcium and phosphate in this solution are 700 mM and 740 mM respectively. No precipitate formation was observed after standing for 48 hours at room temperature.

0.1 mL of this solution was added to 3 mL of a commercially available TPN solution (4.25% amino acids, 25% dextrose, 13 mEq/L potassium, 20 mEq/L sodium, 8 mEq/L magnesium, 4.7 mEq/L calcium, 14 mM phosphate, 45 mEq/L acetate) to provide a solution overall 25 mM in calcium and 37 mM in phosphate. No precipitate formation was observed after standing at room temperature for one week.

EXAMPLE No. 2

(i) To 5 mL of a commercially available TPN solution (4.25% amino acids, 25% dextrose, 13 mEq/L potassium, 20 mEq/L sodium, 8 mEq/L magnesium, 4.7 mEq/L calcium, 14 mM phosphate, 45 mEq/L acetate) were added 15 mg solid D-fructose 1,6-diphosphate monocalcium salt (which dissolved immediately) and 0.10 mL of a 1.0 M calcium chloride aqueous solution. The final pH is 5.8, and the final concentrations of calcium and phosphate are 37 mM and 27 mM.

(ii) To 5 mL of the same TPN solution were added 13 mg solid D-fructose 1,6-diphosphate monocalcium salt (which dissolved immediately) and 0.12 mL 0.83 M calcium acetate aqueous solution. The final pH is 5.8 and the final concentrations of calcium and phosphate are 35 mM and 25 mM.

(iii) To 5 mL of the same TPN solution were added 32 mg solid D-fructose 1,6-diphosphate monocalcium salt (which dissolved immediately) and 0.15 mL 0.83 M calcium acetate aqueous solution. The final pH is 5.6 and the final concentrations of calcium and phosphate are 43 mM and 45 mM.

None of the three solutions exhibited any sign of decomposition or precipitation after standing at room temperature for one month.

Thus, the present invention provides a means to combine both calcium and phosphate at relatively high concentrations in an aqueous solution. These are stable over prolonged periods of time and can be stored and/or sterilized without precipitation. This can be used in parenteral and enteral solutions.

Further the solid complex is useful for reconstitution in water or can be ingested as a solid.

The preceding has been a description of the present invention as well as the best mode of practicing the invention known to the inventor at this time.

However the invention is to be defined only by the appended claims wherein I claim:

1. A total parenteral nutrition diet consisting essentially of an aqueous solution having a concentration of at least 10 mM up to 1000 mM of calcium ions and at least 10 mM up to 1000 mM of phosphate ions wherein said phosphate ions are saccharide phosphate ions and wherein said saccharide phosphate ions are selected from the group consisting of fructose diphosphate, sucrose diphosphate, glucose diphosphate, fructose phosphate, sucrose phosphate and glucose phosphate and amino acids, saccharides and nutrients effective to provide the total nutritional diet for a patient.

2. The total parenteral nutrition diet claimed in claim 1 wherein said monosaccharide diphosphate ions are fructose diphosphate ions.

3. The total parenteral nutrition diet claimed in claim 1 wherein said monosaccharide diphosphate ions are glucose diphosphate ions.

4. The total parenteral nutrition diet claimed in claim 1 wherein said saccharide phosphate ions are sucrose diphosphate ions.

5. The total parenteral nutrition diet claimed in claim 1 wherein said concentration of calcium ions is from 10 to about 100 mM and said concentration of phosphate ions is 10 to 100 mM of biologically available phosphate ions.

6. The total parenteral nutrition diet claimed in claim 3 wherein said concentration of calcium ions is from 10 to about 50 mM and the concentration of biologically available phosphate ions is from 10 to about 50 mM.

7. An aqueous solution selected from the group consisting of fruit juice and electrolyte replacement drinks, said solution having at least 10 mM to 1000 mM calcium ions in solution and a concentration of at least 10 mM to 1000 mM phosphate ions in solution, said phosphate ions present in the form selected from the group consisting of fructose diphosphate, sucrose diphosphate, glucose diphosphate, fructose phosphate, sucrose phosphate and glucose phosphate.

8. The total parenteral nutrition diet claimed in claim 1 wherein said aqueous solution is subsequently lyophilized.

9. The total parenteral nutrition diet claimed in claim 2 wherein said aqueous solution is subsequently lyophilized.

10. The total parenteral nutrition diet claimed in claim 3 wherein said aqueous solution is subsequently lyophilized.

11. The total parenteral nutrition diet claimed in claim 4 wherein said aqueous solution is subsequently lyophilized.

12. The total parenteral nutrition diet claimed in claim 5 wherein said aqueous solution is subsequently lyophilized.

13. The total parenteral nutrition diet claimed in claim 6 wherein said aqueous solution is subsequently lyophilized.

* * * * *